United States Patent [19]

Domeier et al.

[11] Patent Number: 4,751,263

[45] Date of Patent: Jun. 14, 1988

[54] CURABLE MOLDING COMPOSITIONS CONTAINING A POLY(ACRYLATE)

[75] Inventors: Linda A. Domeier, Somerville; Michael J. Michno, Jr., Bridgewater, both of N.J.; Edward N. Peters, Lenox, Mass.

[73] Assignee: Union Carbide Corporation, Danbury, Conn.

[21] Appl. No.: 30,270

[22] Filed: Mar. 25, 1987

Related U.S. Application Data

[63] Continuation of Ser. No. 545,605, Oct. 27, 1983, abandoned, which is a continuation of Ser. No. 279,448, Jul. 1, 1981, abandoned.

[51] Int. Cl.$^4$ .............................................. C08K 7/06
[52] U.S. Cl. .................... 524/513; 524/555; 524/558; 525/183; 526/304; 526/323.2
[58] Field of Search ................... 524/513, 555, 558; 525/183

[56] References Cited

U.S. PATENT DOCUMENTS 3,950,298  4/1976  McCown et al. ............. 260/33.6 F
4,170,582 10/1979  Mori et al. ................. 260/29.6 RW

FOREIGN PATENT DOCUMENTS 49-94784 11/1972 Japan .

*Primary Examiner*—Joseph L. Schofer
*Assistant Examiner*—Bernard Lipman
*Attorney, Agent, or Firm*—Paul W. Leuzzi

[57] ABSTRACT

Described herein are curable molding compositions comprising a mixture of:

(a) a poly(acrylate) characterized by the following empirical formula:

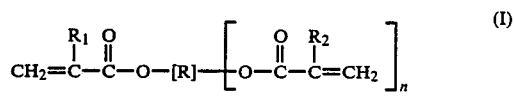

wherein R is the hydroxy-free residue of an organic polyhydric alcohol which contained alcoholic hydroxyl groups bonded to different carbon atoms, $R_1$ and $R_2$ are independently hydrogen or methyl, and n is 1 to 3, (b) acrylic or methacrylic acid or a functionalized derivative thereof having a molecular weight of less than 300 which is different from (a), and (c) an ethylenically unsaturated monomer which is soluble in and copolymerizable with (a) and (b) and which is different from (a) and (b). The compositions can also contain one or more fibers with a melting point or a glass transition temperature above about 130° C.

11 Claims, No Drawings

CURABLE MOLDING COMPOSITIONS CONTAINING A POLY(ACRYLATE)

This application is a continuation of prior U.S. application Ser. No. 545,605 filing date Oct. 27, 1983, now abandoned which is a continuation of application 279,448 filing date July 1, 1981 now abandoned.

This invention is directed to a curable molding composition containing (a) a poly(acrylate), (b) acrylic or methacrylic acid or functionalized derivatives thereof which are different from (a), and (c) an ethylenically unsaturated monomer which is soluble in and copolymerizable with (a) and (b) and which is different from (a) and (b). The combination of components in the composition of this invention have been found to produce reinforced articles having a particularly good balance of mechanical properties. Molded reinforced articles may be produced from the composition of this invention by a very rapid mold cycle which is typically less than about 2 minutes from the time the cure of the resin is initiated.

French Pat. No. 1,567,710 describes the manufacture of the diacrylate of dipropoxylated bisphenol-F which is thereafter diluted with styrene in a ratio of about 30 parts by weight of styrene to about 70 parts by weight of the bis(acrylate). This material is reacted in the presence of benzoyl peroxide to effect a cured product in about 14 minutes and 30 seconds. The same resin is also catalyzed with 1 percent benzoyl peroxide as a 50 percent solution in tricresylphosphate and 0.15 percent diethylaniline. The resulting resin is used to make a fiberglass reinforced plastic laminate containing 12 layers of fiber resulting in a laminated sheet about 3 millimeters thick. The sheet sets in about 1 hour and then is heated at 115° C. for 24 hours, Methyl methacrylate was also used to produce the bis(methacrylate) product which was also combined with styrene and evaluated for its SPI gel test time. Further experiments were carried out in the patent making the dimethacrylate of ethylene glycol which was polymerized with benzoyl peroxide.

U.S. patent application Ser. No. 129,883, filed Mar. 27, 1980 in the name of E. N. Peters and titled "A Poly(Acrylate) Containing Composition And Process For Producing Molded Articles", describes compositions containing a particular poly(acrylate), an ethylenically unsaturated monomer which is soluble in and copolymerizable with the poly(acrylate), and an elevated temperature free-radical curing catalyst capable of effecting the co-reaction of the poly(acrylate) and ethylenically unsaturated monomer.

The Examples of said U.S. patent application Ser. No. 129,883 describe that resins prepared from poly(acrylates), such as ethoxylated bisphenol-A dimethacrylate, tetraethylene glycol dimethacrylate, triethylene glycol dimethacrylate and diethylene glycol dimethacrylate, and styrene produce composites, which have a good balance of mechanical properties. These composites contain up to 58 weight percent of glass.

THE INVENTION

It has now been found that when a comonomer i.e., acrylic or methacrylic acid or functionalized derivatives thereof, is added to a poly(acrylate) resin containing a poly(acrylate) and an ethylenically unsaturated monomer, the resulting resin compositions produce reinforced articles having substantially improved mechanical properties over those of composites which do not contain these particular comonomers.

It has also been found that certain ratios of the components of the compositions as well as particular components thereof offer enhanced cure speeds with mold closed cycles typically about 1 minute or less from the time the cure of the resin is initiated. Such enhanced cure speeds are seen even in thick articles such as those which are 3/16 inches thick.

This combination of outstanding composite mechanical properties and, in many cases exceptional cure speed, make these resins especially suitable for the rapid production of glass-reinforced composites via the molding technology described below.

The improved curable molding composition of this invention comprises a mixture of (a) a poly(acrylate) characterized by the following empirical formula:

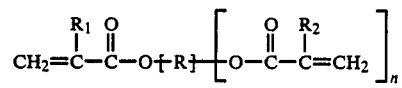

wherein R is the hydroxy-free residue of an organic polyhydric alcohol which contained alcoholic hydroxyl groups bonded to different carbon atoms, $R_1$ and $R_2$ are independently hydrogen or methyl, and n is 1 to 3;

(b) acrylic or methacrylic acid or a functionalized derivative thereof having a molecular weight of less than 300 which is different from (a), and (c) an ethylenically unsaturated monomer which is soluble in and copolymerizable with (a) and (b) and which is different from (a) and (b).

The instant resin compositions have low viscosities, i.e., less than about 50 centipoise, preferably less than about 25 centipoise, so that they can be used to produce thermoset resin articles containing up to about 75 weight percent of reinforcing fibers by a very rapid mold cycle.

The poly(acrylate) is characterized by the following empirical formula:

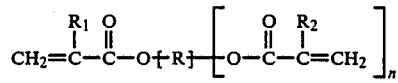

wherein R is the residue of an organic polyhydric alcohol which contained alcoholic hydroxyl groups bonded to different carbon atoms, $R_1$ and $R_2$ are independently hydrogen or methyl, and n is 1 to 3.

The polyhydric alcohol suitable for preparing the poly(acrylate) typically contains at least two carbon atoms and may contact from 2 to 4, inclusive, hydroxyl groups. These polyhydric alcohols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, polypropylene glycol having an average molecular weight of about 150 to about 600, triethylene glycol, 1-4-cyclohexane dimethanol, neopentyl glycol, 2,2-dimethyl-3-hydroxypropyl 2,2-dimethyl-3-hydroxypropionate, polyethylene glycol having an average molecular weight of about 150 to about 600, 2,2-bis[4-(2-hydroxyethoxy)phenyl]propane, 2,2-bis[4-(2-hydroxypropoxy)phenyl]propane, triethanolamine, 1,3-butanediol, tetraethylene glycol, 2,2-bis(4-hydroxyphenyl)propane, glycerine, trimethylolpropane, 1,4-butanediol, the polycaprolactone ester of trimethylolpropane which contains about 1.5 equivalents of caprolactone, the polycaprolactone ester of trimethylolpropane which contains about 3.6 equivalents of caprolactone, 2-ethyl-1,3-hexanediol, 1,5-pentanediol, tripropylene glycol, 2,2-bis-(4-hydroxycyclohexyl)propane, 1,2,6-hexanetriol, 1,3-propanediol, 1,6-hexanediol and the like. Mixtures of the aforementioned polyols may be used in this invention.

The poly(acrylate) of the aforementioned organic polyhydric alcohol can be prepared by the reaction of acrylic acid or methacrylic acid or their simple esters with the polyhydric alcohol under conditions well known in the art. Poly(acrylates) produced by the addition of acrylic or methacrylic acid across ethylenically unsaturated bonds, such as in dicyclopentadiene diacrylate or dimethacrylate may also be used in the practice of this invention.

The preferred poly(acrylates) include ethoxylated bisphenol A dimethacrylate, tetraethylene glycol dimethacrylate, diethylene glycol dimethacrylate, ethoxylated bisphenol A diacrylate, tetraethylene glycol diacrylate, diethylene glycol diacrylate, trimethylolpropane triacrylate, and trimethylolpropane trimethacrylate.

Component (b) in the composition of this invention is acrylic or methacrylic acid or a functionalized derivative thereof which is different from (a). Mixtures of these may also be used. The functionalized derivatives are characterized by the presence of acrylate, methacrylate, acrylamide, and methacrylamide groups and also by the presence of functional groups such as hydroxyl, amino, alkylamino, ether, and epoxide, for example. The molecular weight of these monomers is typically less than 300. Preferred monomers are characterized by the following formula:

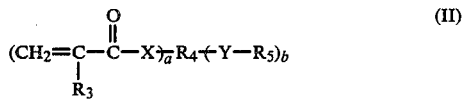   (II)

wherein $R_3$ is independently hydrogen or methyl; X and Y are independently -O- or

wherein $R_6$ is hydrogen or lower alky; $R_4$ is an aliphatic or aromatic radical containing from 2 to about 10 carbon atoms, optionally containing -O- or

$R_5$ is hydrogen or an aliphatic or aromatic radical containing from 1 to 10 carbon atoms; and a and b are integers of or greater than 1, preferably 1 to 3.

These functionalized derivatives of acrylic or methacrylic acid include 2-hydroxyethyl acrylate, 2-hydroxyethyl methacrylate, hydroxypropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methoxyethyl acrylate, 2-methoxyethyl methacrylate, pentaerythritol monoacrylate pentaerythritol monomethacrylate, pentaerythritol diacrylate, pentaerythritol dimethacrylate, pentaerythritol triacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like, or mixtures thereof. It is understood that several isomers of many of these monomers exist and would be suitable for use herein either as individual components or as mixtures with any of the other monomers Similarly, it is understood that additional derivatives containing aromatic rings and other alkyl groups in the acid or ester portion of Formula II may also be included.

Component (c) of this invention is an ethylenically unsaturated monomer which is soluble in and copolymerizable with (a) and (b) and which is different from (a) and (b).

These ethylenically unsaturated monomers contain at least a single —CH=C<group, and preferably a $CH_2$=C<group and include styrene and its derivatives and homologues, divinylbenzene, diallylphthalate, non-functionalized esters of acrylic or methacrylic acid (such as ethyl acrylate, butyl acrylate, and methyl methacrylate), unsaturated nitriles (such as acrylonitrile and methacrylonitrile), and the like. Also the monomers include vinyl esters, e.g. vinyl acetate, vinyl propionate, and the like. Mixtures of the aforementioned monomers may be effectively employed in the practice of this invention.

The most preferred ethylenically unsaturated monomer contemplated in the practice of this invention is styrene.

In the composition of this invention component (a) is present in amounts of from about 10 to about 75, preferably from about 25 to about 60 weight percent; component (b) is present in amounts of from about 2 to about 75, preferably from about 5 to about 30 weight percent; and component (c) is present in amounts of from about 10 to about 75, preferably from about 25 to about 65 weight percent.

A free-radical curing catalyst which initiates curing via the co-reaction of the poly(acrylate), the acrylic or methacrylic acid or functionalized derivative thereof, and the ethylenically unsaturated monomer is included in this invention. These curing catalysts include azo compounds, peroxides, peresters, perketals, and the like.

Azo and peroxide curing agents are described by, for example, Gallagher, et al. "Organic Peroxides Review, Plastics Design & Processing", July, 1978, pages 38–42, and August, 1978, pages 60–67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators effect a desirable cure is generally characterized in the aforementioned articles.

Examples of such curing catalysts include 1,1-di-t-butylperoxycyclohexane, 2,2-di-t-butylperoxybutane, 2,2-di-t-butylperoxy-4-methylpentane, 2,2-dicumylperoxypropane, butyl-2,2-di-t-butylperoxyvalerate, 1,1-bis(2,2,4-trimethylpentyl-2-peroxy)-cyclohexane, 2,2'-azo-bis-isobutyronitrile, dibenzoyl peroxide, lauroyl peroxide, di-t-butyl peroxide, diisopropyl peroxide carbonate, t-butylperoxy-2-ethylhexanoate, t-butylperpivalate, 2,5-dimethylhexane-2,5-di-per-ethylhexanoate, t-butyl peroctoate, t-butyl perneodecanoate, t-butyl perbenzoate, t-butyl percrotonate, t-butyl perisobutyrate, di-t-butyl perphthalate, 1,1-bis(t-butylperoxy)-3,3,5-trimethylcyclohexane, bis(4-t-butylcyclohexyl)peroxydicarbonate, methyl ethyl ketone peroxide, 2,4-pentanedione peroxide, bis(t-butylperoxy) diisopropylbenzene, 2,4,4-trimethylpentyl-2-peroxycyclohexane carboxylate, 2-t-butylazo-2-cyano-4-methylpentane, ethyl 3,3-di(t-butylperoxy)butyrate, and the like. These are commercially available materials.

The peresters and perketals may be used in combination with an acid cure accelerator as described in Netherlands published Patent Application No. 7604405. These acids include Bronsted acids with a $pK_a$ value lower than or equal to that of formic acid, such as hydrochloric acid, sulfuric acid, nitric acid, phosphoric acid, trichloroacetic acid, p-toluenesulfonic acid, and the like. Also Lewis acids or metal halides with Lewis acid properties, such as boron trifluoride and the chlorides of iron, cobalt, zinc and aluminum, may be used.

Additionally, the above described curing catalyts may be used in combination with other cure accelerators such as cobalt compounds. These cobalt compounds include cobalt naphthenate, cobalt-amine cure promoters (such as those designated as PEP 183-S and available from Air Products Incorporated), and the like. These cure accelerators operate by decomposing the curing catalysts at a temperature below their normal activation or decomposition temperature.

Mixtures of the curing catalysts may be used herein, such as mixtures of peresters and/or ketals, of perketals and azo compounds, or of peresters and azo compounds.

The concentration of the curing agent can be varied within wide limits. As a representative range, the concentration can vary from about 0.25 to about 3.0 weight percent, preferably from about 0.5 to about 2.5 weight percent, and most preferably, from about 0.75 to about 2.0 weight percent, based on the weight of components (a), (b) and (c).

The compositions of this invention are prepared by solution blending the poly(acrylate), the acrylic or methacrylic acid or functionalized derivative thereof, the ethylenically unsaturated monomer, a free radical curing catalyst, and any other optional ingredients at ambient temperatures.

The fibers, which may be used in this invention as reinforcing agents, have a melting point or a glass transition temperature above about 130° C. These fibers include fiberglass, carbon fibers, aromatic polyamide fibers (such as aramid fibers sold by E. I. duPont de Nemours & Company, Wilmington, Del., under the trademark of Kevlar), metal fibers, such as aluminum and steel fibers, boron fibers, and the like.

The carbon fibers include those having a high Young's modulus of elasticity and high tensile strength. These carbon fibers may be produced from pitch, as described in U.S. Pat. Nos. 3,976,729; 4,005,183 and 4,026,788, for example.

The preferred fibers are fiberglass, carbon fibers, aromatic polyamide fibers, and mixtures thereof.

The fibers which are suitable for use in this invention, preferably, have a length of at least ¼ inch, and an average length of at least ½ inch. Fibers with different lengths exceeding ¼ inch may be used, provided that at least about 50 percent of the fibers have lengths greater than ½ inch. Preferred fiber lengths are from 1 to 2 or more inches. Continuous filaments may also be used.

It is also within the scope of this invention to include the use of fiber reinforcements of shorter lengths and also fillers such as milled glass.

The molded article contains from about .10 to about 75, preferably from about 40 to about 70 weight percent of the reinforcement fiber or from about 20 to about 40 weight percent of milled glass reinforcement.

It is, furthermore, desirable to utilize a vinyl polymerization inhibitor in those cases where the resin solution is to be stored and/or shipped. Suitable vinyl polymerization inhibitors are hydroquinone, para-benzoquinone, t-butyl catechol, quinhydrone, toluhydroquinone, mono-t-butylhydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely from about 100 to about 1000 ppm of the combined weight of components (a), (b) and (c).

The composition of this invention may also include other ingredients, such as mold release agents, and the like.

A preferred procedure for producing a molded article from the compositions of this invention is described in U.S. patent application Ser. No. 135,906 entitled "Molding Process and Apparatus Therefore", and filed on Apr. 14, 1980 in the name of R. Angell, Jr., which is incorporated herein by reference. In this application, a process for rapidly fabricating fiber reinforced thermoset resin articles is described. The fiber reinforcement is comprised of one or more fibers with a melting point or a transition temperature above about 130° C. The process comprises the steps of (a) providing one or more fibers with a melting point or a glass transition temperature above about 130° C. in the form of an interlocked mass in a heatable matched metal die mold, (b) providing in one or more accumulator zones, a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperature below that at which curing of said material is substantial, (c) closing the mold containing the web, (d) injecting at least a portion of said thermosettable organic material under pressure from said accumulator zone(s) into the mold to thereby fill the cavity in said mold, (e) initiating the curing of said material in said mold by subjecting the material to a temperature above the temperature at which the curing of said material is initiated, by heating the mold, and (f) opening said mold and removing the cured thermoset article therefrom.

In said U.S. patent application Ser. No. 135,906 the apparatus comprises: (a) a heatable matched die mold containing one or more cavities therein with means for opening said mold to expose such cavities, and closing the same, and means for controlling the injection of a thermosettable organic liquid to such cavities when the mold is closed (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, (d) cooling means associated with the means for controlling the injection of such liquid to such cavities, whereby the temperature of the liquid in such injection means is maintained substantially below the temperature of the mold.

EXAMPLES

The following examples serve to illustrate specific embodiments of this invention and it is not intended that the invention shall be limited by the examples.

In the examples, the flexural strength and modulus of the prepared composites were measured according to the procedure described in ASTM D-790. In each example, five separate flexural bars were tested from each plaque and the values listed are the average of those tests.

In each of the following examples a thermocouple was inserted in the mold midway through the glass mat and the cure rate was observed by measuring the time from resin injection to the time of maximum exotherm in the resin. This time span is designated below as the time to peak exotherm and the time given is an average of several runs. The apparatus used was similar to that described in U.S. patent application Ser. No. 135,906 described, supra.

Control A

Approximately 200 grams (approximately ten 10×5½ inch sheets) Type AKM glass mat (PPG Industries, Inc. Pittsburgh, Penn.) was placed in a 10×5½×3/16 inch constant volume mold preheated to 140° C. The mold was closed, evacuated for about 5 seconds, and a resin portion containing 50 weight percent ethoxylated bisphenol A dimethacrylate, 50 weight percent styrene, 0.5 phr Zelec UN mold release (an organophosphate mold release sold by E. I. duPont de Nemours, Wilmington, Del.), and 1.5 phr of 1,1-di-t-butylperoxy-3,3,5-trimethylcyclohexane (Trigonox 29-B-75 sold by Noury Chemical Corp., Burt, N.Y.) was injected at a pressure of 300 psi into the mold. The pressure was maintained for a dwell period of 10 seconds. A time to peak exotherm of about 64 seconds was measured. After 89 seconds, the cured glass reinforced composite was removed from the mold. The composite contained 67 weight percent glass as determined by ashing.

The composite was tested for flexural strength and modulus.

The results are shown in Table I.

Control B

The procedure of Control A was repeated except that the resin contained the following ingredients:
50 wt. percent ethoxylated bisphenol A dimethacrylate,
28 wt. percent styrene,
22 wt. percent ethyl acrylate,
1.5 phr Trigonox 29-B-75, and
0.5 phr Zelec UN mold release.

A time to peak exotherm of about 64 seconds was observed.

The cured composite was removed from the mold after 90 seconds and tested as described in Control A.

The results are shown in Table I.

EXAMPLE 1

The procedure of Control A was repeated except that the resin contained the following ingredients:
50 wt. percent ethoxylated bisphenol A dimethacrylate,
28 wt. percent styrene.
22 wt. percent 2-hydroxyethyl acrylate,
1.5 phr Trigonox 29-B-75, and
0.5 phr Zelec UN mold release.

A time to peak exotherm of about 48 seconds was observed.

The cured composite was removed from the mold after 64 seconds and tested as described in Control A.

The results are shown in Table I.

EXAMPLE 2

The procedure of Control A was repeated except that the resin contained the following ingredients:
50 wt. percent of ethoxylated bisphenol A dimethacrylate,
28 wt. percent of styrene,
22 wt. percent of 2-hydroxyethyl methacrylate,
1.5 phr of Trigonox 29-B-75, and
0.5 phr of Zelec UN mold release.

A time to peak exotherm of about 59 seconds was observed.

The cured composite was removed from the mold after 90 seconds and tested as described in Control A.

The results are shown in Table I.

EXAMPLE 3

The procedure of Control A was repeated except that the resin contained the following ingredients:
50 wt. percent of ethoxylated bisphenol A dimethacrylate,
28 wt. percent of styrene,
22 wt. percent of hydroxypropyl acrylate,
1.5 phr of Trigonox 29-B-75, and
0.5 phr of Zelec UN mold release.

A time to peak exotherm of about 48 seconds was observed.

The cured composite was removed from the the mold after 64 seconds and tested as described in Control A.

The results are shown in Table I.

EXAMPLE 4

The procedure of Control A was repeated except that the resin contained the following ingredients:
50 wt. percent of ethoxylated bisphenol A dimethacrylate,
28 wt. percent of styrene,
22 wt. percent of 2-methoxyethyl acrylate,
1.5 phr of Trigonox 29-B-75, and
0.5 phr of Zelec UN mold release.

A time to peak exotherm of about 49 seconds was observed.

The cured composite was removed from the mold after 137 seconds and tested as described in Control A.

The results are shown in Table I.

EXAMPLE 5

The procedure of Control A was repeated except that the resin contained the following ingredients:
  50 wt. percent of ethoxylated bisphenol A dimethacrylate,
  28 wt. percent of styrene,
  22 wt. percent of 2-dimethylaminoethyl acrylate,
  1.5 phr of Trigonox 29-B-75, and
  0.5 phr of Zelec UN mold release.

A time to peak exotherm of about 68 seconds was observed.

The cured composite was removed from the mold after 98 seconds and tested as described in Control A. The results are shown in Table I.

TABLE I

| Example | Resin Ingredients[1] | wt. % | Time to peak exotherm (sec.) | Molding time (sec.) | Wt. % glass | Properties of the Composite Flexural strength (psi) | Flexural Modulus (psi) × $10^6$ |
| --- | --- | --- | --- | --- | --- | --- | --- |
| Control A | EBAM | 50 | 64 | 89 | 67 | 21,800 | 1.72 |
|  | Styrene | 50 |  |  |  |  |  |
| Control B | EBAM | 50 |  |  |  |  |  |
|  | Styrene | 28 | 64 | 90 | 68 | 14,900 | 1.02 |
|  | EA | 22 |  |  |  |  |  |
| 1 | EBAM | 50 |  |  |  |  |  |
|  | Styrene | 28 | 48 | 64 | 65 | 39,500 | 2.09 |
|  | HEA | 22 |  |  |  |  |  |
| 2 | EBAM | 50 |  |  |  |  |  |
|  | Styrene | 28 | 59 | 90 | 67 | 35,500 | 1.95 |
|  | HEMA | 22 |  |  |  |  |  |
| 3 | EBAM | 50 |  |  |  |  |  |
|  | Styrene | 28 | 48 | 64 | 68 | 27,400 | 2.18 |
|  | HPA | 22 |  |  |  |  |  |
| 4 | EBAM | 50 |  |  |  |  |  |
|  | Styrene | 28 | 49 | 137 | 67 | 25,300 | 1.86 |
|  | MEA | 22 |  |  |  |  |  |
| 5 | EBAM | 50 |  |  |  |  |  |
|  | Styrene | 28 | 68 | 98 | 70 | 26,000 | 1.63 |
|  | DMAA | 22 |  |  |  |  |  |

[1]EBAM = ethoxylated bisphenol A dimethacrylate
EA = ethyl acrylate
HEA = 2-hydroxyethyl acrylate
MEA = 2-methoxyethyl acrylate
DMAA = 2-dimethylaminoethyl acrylate
HEMA = 2-hydroxyethyl methacrylate
HPA = hydroxypropyl acrylate

EXAMPLES 6 to 8

The following Examples illustrate the effect of varying the amounts of the components of the composition on the physical properties.

EXAMPLE 6

The procedure of Control A was repeated except that the resin contained the following ingredients:
  28 wt. percent of ethoxylated bisphenol A dimethacrylate,
  50 wt. percent of styrene,
  22 wt. percent of 2-hydroxyethyl acrylate,
  1.5 phr of Trigonox 29-B-75, and
  0.5 phr of Zelec UN mold release A time to peak exotherm of about 68 seconds was observed.

The cured composite was removed from the mold after 101 seconds and tested as described in Control A. The results are shown in Table II.

EXAMPLE 7

The procedure of Control A was repeated except that the resin contained the following ingredients:
  33 wt. percent of ethoxylated bisphenol A dimethacrylate,
  33 wt. percent of styrene,
  33 wt. percent of 2-hydroxyethyl acrylate
  1.5 phr of Trigonox 29-B-75, and
  0.5 phr of Zelec UN mold release.

A time to peak exotherm of about 53 seconds was observed.

The cured composite was removed from the mold after 74 seconds and tested as described in Control A. The results are shown in Table II.

EXAMPLE 8

The procedure of Control A was repeated except that the resin contained the following ingredients:
  40 wt. percent of ethoxylated bisphenol A dimethacrylate,
  40 wt. percent of styrene
  20 wt. percent of 2-hydroxyethyl acrylate,
  1.5 phr of Trigonox 29-B-75, and
  0.5 phr of Zelec UN mold release.

A time to peak exotherm of about 62 seconds was observed.

The cured composite was removed from the mold after 88 seconds and tested as described in Control A. The results are shown in Table II.

TABLE II

| Example | Resin Ingredients[1] | wt. % | Time to peak exotherm (sec.) | Molding time (sec.) | Wt. % glass | Properties of the Composite Flexural strength (psi) | Flexural Modulus (psi) × $10^6$ |
| --- | --- | --- | --- | --- | --- | --- | --- |
| 6 | EBAM | 28 |  |  |  |  |  |
|  | Styrene | 50 | 68 | 101 | 66 | 40,700 | 1.85 |
|  | HEA | 22 |  |  |  |  |  |

TABLE II-continued

| Example | Resin Ingredients[1] | wt. % | Time to peak exotherm (sec.) | Molding time (sec.) | Wt. % glass | Properties of the Composite Flexural strength (psi) | Flexural Modulus (psi) × 10^6 |
|---|---|---|---|---|---|---|---|
| 7 | EBAM | 33 | | | | | |
|   | Styrene | 33 | 53 | 74 | 65 | 37,700 | 2.09 |
|   | HEA | 33 | | | | | |
| 8 | EBAM | 40 | | | | | |
|   | Styrene | 40 | 62 | 88 | 67 | 40,200 | 2.16 |
|   | HEA | 20 | | | | | |
| 1 | EBAM | 50 | | | | | |
|   | Styrene | 28 | 48 | 64 | 65 | 39,500 | 2.09 |
|   | HEA | 22 | | | | | |

EBAM = ethoxylated bisphenol A dimethacrylate
HEA = 2-hydroxyethyl acrylate

Control C The procedure of Control A was exactly repeated except that the resin contained the following ingredients:

50 wt. percent of ethoxylated bisphenol A diacrylate,
50 wt. percent of styrene,
1.5 phr of Trigonox 29-B-75, and
0.5 phr of Zelec UN mold release.

A time to peak exotherm of about 56 seconds was observed.

The cured composite was removed from the mold after 71 seconds and tested as described in Control A. The results are shown in Table III.

EXAMPLE 9

The procedure of Control A was exactly repeated except that the resin contained the following ingredients:

50 wt. percent of ethoxylated bisphenol A diacrylate,
28 wt. percent of styrene,
22 wt. percent of 2-hydroxyethyl acrylate,
1.5 phr of Trigonox 29-B-75, and
0.5 phr of Zelec UN mold release.

A time to peak exotherm of about 45 seconds was observed.

The cured composite was removed from the mold after 61 seconds and tested as described in Control A. The results are shown in Table III.

EXAMPLE 10

The procedure of Control A was exactly repeated except that the resin contained the following ingredients:

50 wt. percent of ethoxylated bisphenol A diacrylate,
28 wt. percent of styrene,
22 wt. percent of 2-hydroxyethyl methacrylate,
1.5 phr of Trigonox 29-B-75, and
0.5 phr of Zelec UN mold release.

A time to peak exotherm of about 59 seconds was observed.

The cured composite was removed from the mold after 77 seconds and tested as described in Control A. The results are shown in Table III.

Control D

The procedure of Control A was exactly repeated except that the resin contained the following ingredients:

50 wt. percent of diethylene glycol diacrylate,
50 wt. percent of styrene,
1.5 phr of Trigonox 29-B-75, and
0.5 phr of Zelec UN mold release.

A time to peak exotherm of about 51 seconds was observed.

The cured composite was removed from the mold after 67 seconds and tested as described in Control A. The results are shown in Table III.

EXAMPLE 11

The procedure of Control A was exactly repeated except that the resin contained the following ingredients:

50 wt. percent of diethylene glycol diacrylate,
28 wt. percent of styrene,
22 wt. percent of 2-hydroxyethyl acrylate,
1.5 phr of Trigonox 29-B-75, and
0.5 phr of Zelec UN mold release.

A time to peak exotherm of about 33 seconds was observed.

The cured composite was removed from the mold after 52 seconds and tested as described in Control A. The results are shown in Table III.

TABLE III

| Example | Resin Ingredients[1] | wt. % | Time to peak exotherm (sec.) | Molding time (sec.) | wt. % glass | Properties of Composite Flexural strength (psi) | Flexural Modulus (psi) × 10^6 |
|---|---|---|---|---|---|---|---|
| Control C | EBBA | 50 | | | | | |
|   | Styrene | 50 | 56 | 71 | 68 | 17,700 | 1.20 |
| 9 | EBAA | 50 | | | | | |
|   | Styrene | 28 | 45 | 61 | 63 | 37,800 | 1.97 |
|   | HEA | 22 | | | | | |
| 10 | EBAA | 50 | | | | | |
|   | Styrene | 28 | 59 | 77 | 66 | 37,300 | 2.08 |
|   | HEMA | 22 | | | | | |
| Control D | DEGDA | 50 | | | | | |
|   | Styrene | 50 | 51 | 67 | 69 | 15,600 | 1.15 |
| 11 | DEGDA | 50 | | | | | |
|   | Styrene | 28 | 33 | 52 | 63 | 25,200 | 1.67 |

TABLE III-continued

| Example | Resin Ingredients[1] | wt. % | Time to peak exotherm (sec.) | Molding time (sec.) | wt. % glass | Properties of Composite | |
|---|---|---|---|---|---|---|---|
| | | | | | | Flexural strength (psi) | Flexural Modulus (psi) × 10⁶ |
| | HEA | 22 | | | | | |

[1]EBAA = ethoxylated bisphenol A diacrylate
HEA = 2-hydroxyethyl acrylate
HEMA = 2-hydroxyethyl methacrylate
DEDDA = diethylene glycol diacrylate The following Examples 12–15 illustrate the use of a combination of poly(acrylates).

EXAMPLE 12

The procedure of Control A was exactly repeated except that the resin contained the following ingredients and the mold dimensions were 10×5½×1/10 inches:

35 wt. percent of ethoxylated bisphenol A dimethacrylate,
15 wt. percent of trimethylolpropane triacrylate,
28 wt. percent of styrene,
22 wt. percent of 2-hydroxyethylmethacrylate,
1.5 phr of Trigonox 29-B-75, and
0.5 phr of Zelec UN mold release.

The time to peak exotherm was not observed. The cured composite was removed from the mold after seconds. The composite so formed contained 72 wt. percent of glass.

The flexural strength of the composite was 33,900 psi and the flexural modulus was 2.17×10⁶ psi.

EXAMPLE 13

The procedure of Control A was exactly repeated except that the resin contained the following ingredients:

25 wt. percent of ethoxylated bisphenol A dimethacrylate,
25 wt. percent of diethylene glycol dimethacrylate,
28 wt. percent of styrene,
22 wt. percent of 2-hydroxyethyl acrylate,
1.5 phr of Trigonox 29-B-75, and
0.5 phr of Zelec UN mold release A time to peak exotherm of about 41 seconds was observed.

The cured composite was removed from the mold after 63 seconds. The composite so formed contained 65 wt. percent of glass.

The flexural strength of the composite was 32,900 psi and the flexural modulus was 1.81×10⁶ psi.

EXAMPLE 14

The procedure of Control A was exactly repeated except that the resin contained the following ingredients:

25 wt. percent of ethoxylated bisphenol A diacrylate,
25 wt. percent of diethylene glycol diacrylate,
28 wt. percent of styrene,
22 wt. percent of 2-hydroxyethyl acrylate,
1.5 phr of Trigonox 29-B-75, and
0.5 phr of Zelec UN mold release.

A time to peak exotherm of about 40 seconds was observed.

The cured composite was removed from the mold after 61 seconds. The composite so formed contained 65 wt. percent of glass.

The flexural strength of the composite was 34,900 psi and the flexural modulus was 1.90×10⁶ psi.

EXAMPLE 15

The procedure of Control A was exactly repeated except that the resin contained the following ingredients:

25 wt. percent of ethoxylated bisphenol A diacrylate,
25 wt. percent of diethylene glycol diacrylate,
28 wt. percent of styrene,
22 wt. percent of 2-hydroxyethyl methacrylate,
1.5 phr of Trigonox 29-B-75, and
0.5 phr of Zelec UN mold release.

A time to peak exotherm of about 55 seconds was observed.

The cured composite was removed from the mold after 103 seconds. The composite so formed contained 64 wt. percent of glass.

The flexural strength of the composite was 36,600 psi and the flexural modulus was 1.97×10⁶ psi.

EXAMPLE 16

The procedure of Control A was exactly repeated except that the resin contained the following ingredients:

50 wt. percent of ethoxylated bisphenol A dimethacrylate,
44 wt. percent of styrene,
6 wt. percent of acrylic acid,
1.5 phr of t-butylperbenzoate
0.6 phr of PEP 183-S cure accelerator, and
0.5 phr of Zelec mold release.

A time to peak exotherm of about 108 seconds was observed.

The cured composite was removed from the mold after 157 seconds. The composite so formed contained 59 wt. percent of glass.

The flexural strength of the composite was 36,600 psi and the flexural modulus was 1.56×10⁶ psi.

What is claimed is:

1. A molding composition for producing fiber-reinforced thermoset composites which comprises:
   (1) a curable resin portion containing:
      (a) from about 25 to about 60 weight percent of a poly(acrylate) characterized by the following empirical formula:

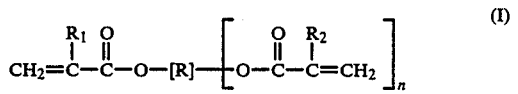

(I)

wherein R is the hydroxy-free residue of an organic polyhydric alcohol which contained alcoholic hydroxyl groups bonded to different carbon atoms, $R_1$ and $R_2$ are independently hydrogen or methyl, and n is 1 to 3,
   (b) from about 5 to about 30 weight percent of acrylic or methacrylic acid or a functionalized derivative thereof having a molecular weight of less than 300 and the following empirical formula $$CH_2=\underset{R_3}{\underset{|}{C}}-\overset{O}{\overset{\|}{C}}-X-R_4-(Y-R_5)_b$$

wherein $R_3$ is independently hydrogen or methyl; X and Y are independently -O- or $$-\underset{|}{\overset{R_6}{N}}-,$$

wherein $R_6$ is hydrogen or lower alkyl; $R_4$ is an aliphatic or aromatic radical containing from 2 to about 10 carbon atoms, optionally containing -O- or $$-\underset{|}{\overset{R_6}{N}}-;$$

$R_5$ is hydrogen or an aliphatic or aromatic radical containing from 1 to 10 carbon atoms; and b is an integer from 1 to 3, and (c) from about 25 to about 65 weight percent of styrene;

(2) a curing initiator; and (3) one or more reinforcing fibers with a melting point or a glass transition temperature above about 130° C.

2. A molding composition as defined in claim 1, wherein poly(acrylate) component (a) of the curable resin portion is one or more of the following: ethoxylated bisphenol A dimethacrylate, ethoxylated bisphenol A diacrylate, tetraethylene glycol dimethacrylate, diethylene glycol dimetharylate, tetraethylene glycol diacrylate, diethylene glycol diacrylate, trimethylolpropane triacrylate, and trimethylolpropane trimethacrylate.

3. A molding composition as defined in claim 1 wherein component (b) of the curable resin portion is one or more of the following: 2-hydroxyethyl acrylate, 2-hydroxyethyl methacrylte, hydroxypropyl acrylate, hydroxypropyl methacrylate, hydroxylbutyl acrylate, hydroxybutyl methacrylate, 2- aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methyoxyethyl acrylate, 2-methoxyethyl methacrylate, pentaerythritol monoacrylate, pentaerythritol monomethacrylate, glycerol monoacrylate, glycerol monomethylacrylate, trimethylolpropane monoacrylate, trimethylolpropane monomethacrylate, glycidyl acrylate, glycidyl methacrylate, and hydroxymethyl acrylamide.

4. A molding composition as defined in claim 1 wherein: component (a) of the resin portion is ethoxylated bisphenol A diacrylate, ethoxylated bisphenol A dimethacrylate, diethylene glycol diacrylate, diethylene glycol dimethacrylate, trimethylolpropane triacrylate or mixtures thereof; and component (b) is acrylic acid, 2-hydroxyethyl acrylate, 2-hydroxyethyl methacrylate, 2-methoxyethyl acrylate, hydroxypropyl acrylate, 2-dimethylaminoethyl acrylate, or mixtures thereof.

5. A molding composition as defined in claim 1 or 4 wherein the reinforcing fiber is fiberglass, carbon fibers, aromatic polyamide fibers or mixtures thereof.

6. A molding composition as defined in claim 5 wherein the reinforcing fiber is present in the composition in an amount from about 10 to about 75 weight percent.

7. A molding composition as defined in claim 1 wherein the curing initiator is a perester and/or perketal, or a mixture of peresters and/or perketals.

8. A molding composition as defined in claim 1 wherein the curing initiator is an azo and/or peroxide containing compound.

9. A molding composition as defined in claim 1 wherein the curing initiator is an azo compound and a perester and/or perketal.

10. A molding composition as defined in claim 1 which contains an acidic cure accelerator.

11. A molding composition as defined in claims 1, 7, 8, or 9 which contains an accelerator comprising a cobalt-containing compound.

* * * * *